United States Patent
Lawin et al.

(10) Patent No.: US 9,813,184 B2
(45) Date of Patent: Nov. 7, 2017

(54) METHOD AND COMMUNICATION CONTROL DEVICE FOR ESTABLISHING A COMMUNICATION CHANNEL IN A COMMUNICATION NETWORK

(71) Applicant: ADVA Optical Networking SE, Meiningen (DE)

(72) Inventors: Mirko Lawin, Meiningen (DE); Stephan Pachnicke, Dortmund (DE)

(73) Assignee: Adva Optical Networking SE, Meiningen (DE)

( * ) Notice: Subject to any disclaimer, the term of this patent is extended or adjusted under 35 U.S.C. 154(b) by 0 days.

(21) Appl. No.: 14/857,019

(22) Filed: Sep. 17, 2015

(65) Prior Publication Data
US 2016/0087749 A1    Mar. 24, 2016

(30) Foreign Application Priority Data
Sep. 19, 2014   (EP) .................................... 14003258

(51) Int. Cl.
*H04J 14/02*   (2006.01)
*H04Q 11/00*   (2006.01)

(52) U.S. Cl.
CPC ........ *H04J 14/0258* (2013.01); *H04J 14/025* (2013.01); *H04J 14/0246* (2013.01); *H04J 14/0257* (2013.01); *H04J 14/0276* (2013.01); *H04J 14/0282* (2013.01); *H04Q 11/0066* (2013.01); *H04J 14/0267* (2013.01); *H04Q 2011/0016* (2013.01); *H04Q 2011/0077* (2013.01); *H04Q 2011/0086* (2013.01)

(58) Field of Classification Search
CPC ......................... H04J 14/0258; H04Q 11/0066
See application file for complete search history.

(56) References Cited

U.S. PATENT DOCUMENTS

| | | | |
|---|---|---|---|
| 7,961,724 B2 | 6/2011 | Dyck et al. | |
| 2002/0109879 A1 | 8/2002 | Wing So | |
| 2007/0019956 A1* | 1/2007 | Sorin ................. | H04J 14/0226 398/71 |

(Continued)

FOREIGN PATENT DOCUMENTS

| | | |
|---|---|---|
| EP | 2675089 A1 | 12/2013 |
| EP | 2773056 A1 | 9/2014 |

OTHER PUBLICATIONS

Oki et al., "Bidirectional Path Setup Scheme Using on Upstream Label Set in Optical GMPLS Networks," IEICE Transactions on Communications, vol. E87-B, Issue 6, pp. 1569-1576 (Jun. 2004).

(Continued)

*Primary Examiner* — Dzung Tran
(74) *Attorney, Agent, or Firm* — The Webb Law Firm

(57) ABSTRACT

The invention relates to a method for establishing a communication channel, preferably an embedded control channel, between a central network node and at least one network unit to be integrated in a communication network including the central network node and an arbitrary but limited number of network units. The central network node is adapted to create and output a wavelength-division multiplex (WDM) downstream signal including downstream channel signals to be transmitted to the network units and to receive a WDM upstream signal including upstream channel signals created by the network units.

17 Claims, 2 Drawing Sheets

(56) References Cited

U.S. PATENT DOCUMENTS

| | | | |
|---|---|---|---|
| 2011/0142442 A1* | 6/2011 | Hirth .................. | H04Q 11/0067 398/25 |
| 2011/0236017 A1* | 9/2011 | Ohlen ................. | H04J 14/0282 398/34 |
| 2013/0251364 A1* | 9/2013 | Pachnicke ........... | H04J 14/0227 398/32 |

OTHER PUBLICATIONS

Markus Roppelt et al., "Tuning Methods for Uncooled Low-Cost Tunable Lasers in WDM-PON," Optical Society of America, (2011).

* cited by examiner

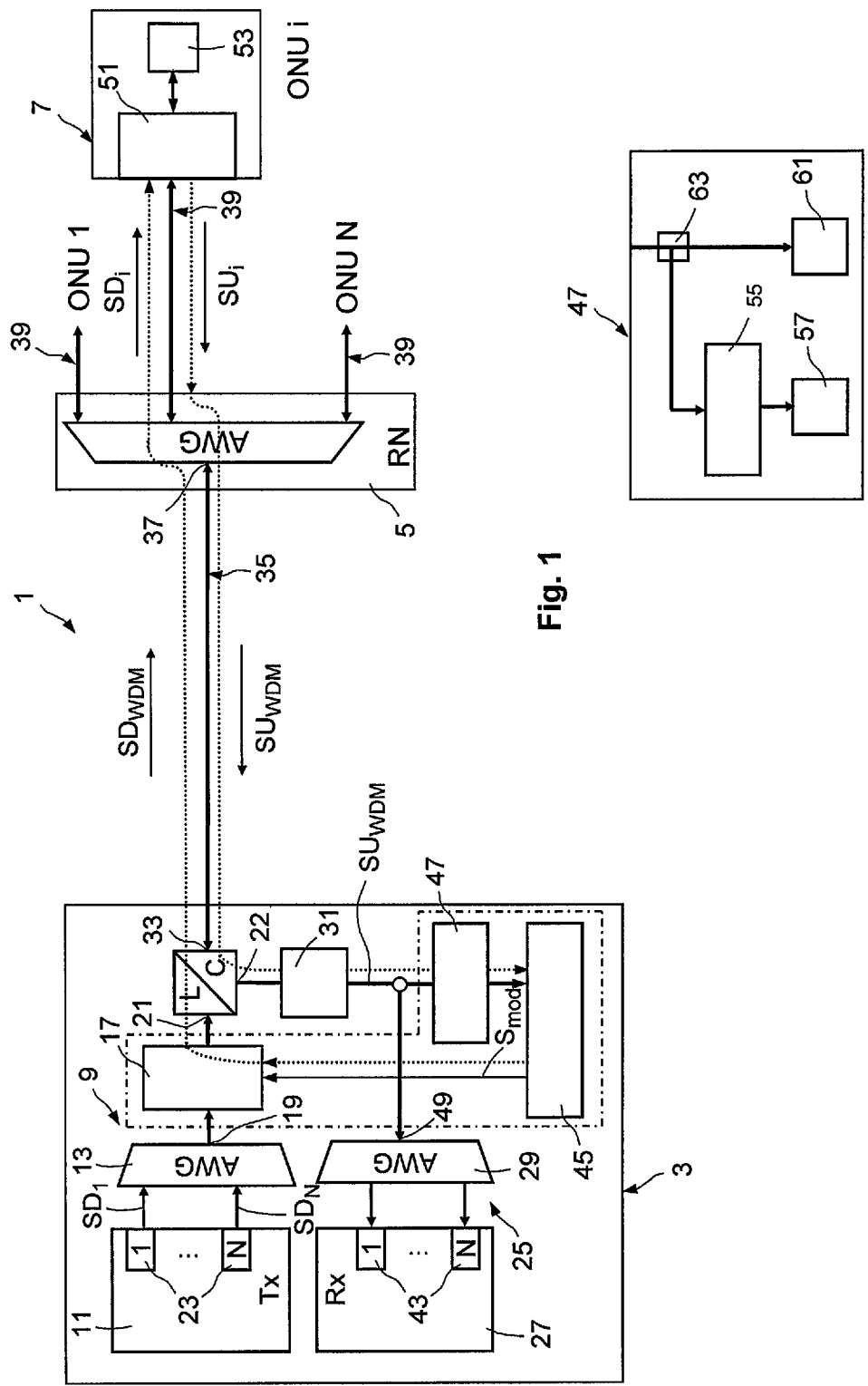

METHOD AND COMMUNICATION CONTROL DEVICE FOR ESTABLISHING A COMMUNICATION CHANNEL IN A COMMUNICATION NETWORK

CROSS-REFERENCE TO RELATED APPLICATIONS

This application claims priority to European Patent Application No. 14 003 258.2 filed Sep. 19, 2014, the disclosure of which is hereby incorporated in its entirety by reference.

BACKGROUND OF THE INVENTION

Field of the Invention

The invention relates to a method for establishing a communication channel, preferably an embedded control channel, between a central network node and at least one network node to be integrated in a communication network.

Description of Related Art

Communication over a shared medium with techniques to manage access to the network to avoid collisions is well known in the literature (e.g. CSMA-CD method used in Ethernet). In the following, however, a different realization with a channel for shared downstream transmission and another channel for shared upstream transmission is assumed. Thus, it is not possible for the newly joining station to listen whether the shared medium is currently used.

There are also numerous ways of assigning network addresses to newly joining stations. These usually rely on a central network manager, which can assign addresses, for example IP addresses, from a database. This, however, requires that physical layer communication and Ethernet communication (using MAC addresses) are already working.

Regarding Ethernet connectivity there are also schemes to assign MAC addresses: usually, however, it is assumed that the likelihood that the MAC address is used elsewhere on the network is very low due to a much higher number of possible MAC addresses compared to the number of used devices (e.g. U.S. Pat. No. 7,961,724). This is true for LANs with a small number of attached devices and a large number of MAC addresses, which can be potentially used. This method, however, cannot be applied in cases in which a limited number of available addresses is available, only.

In connection with the realization of a wavelength-division multiplex passive optical network (WDM-PON), it is known to use an optical spectrum analyzer (OSA) to identify newly joining optical network units (ONUs) (e.g. EP 2 773 056 A1). This, however, requires additional costly components. Alternatively, this solution requires access to the receiver array, which is not possible in a standalone implementation.

In another realization, each ONU could be programmed on delivery with a unique media access control (MAC) address. This MAC address would also need to be programmed into the network management to make the central office or optical line terminal (OLT) aware of a newly joining ONU with a certain address. This additional programming requires additional effort.

SUMMARY OF THE INVENTION

It is thus an object of the present invention to provide a method for establishing a communication channel, preferably an embedded control channel, between a central network node and at least one network unit to be integrated in a communication network comprising the central network node and an arbitrary but limited number of network units which can easily be implemented without the necessity of pre-programming the network units to be integrated and the central network node and which can be implemented by a suitably designed standalone device.

It is another object of the present invention to provide a communication control device for realizing the method. It is a further object of the invention to provide a central network node comprising such a communication control device and a network unit for realizing the method.

Generally, the invention relates to communication networks comprising a central network node and an arbitrary but limited number of network units, wherein the central network node is adapted to create and output a WDM downstream signal comprising downstream channel signals to be transmitted to the network units and to receive a WDM upstream signal comprising upstream channel signals created by the network units.

Here, it shall be mentioned that, in this description, the term wavelength-division-multiplexing (WDM) is used in its broadest sense and is not restricted to optical WDM but shall also include radio WDM, which is more commonly referred to as frequency division multiplexing.

In such communication networks, the WDM downstream and WDM upstream signals (and thus the respective downstream and upstream channel signals) at least share the transmission medium in a transmission path neighboring the central network node. However, in an extreme example, this neighboring path may be given within the central network node, only, e.g. between a plurality of ports for connecting a respective number of network units and a component of the central network node that is configured to combine the transmission paths for the upstream channel signals to a common path for the WDM upstream signal comprising the upstream channel signals. In case wireless (radio) transmission is used between the network units and the central network node, the downstream channel signals may share a WDM path between a component for combining the paths for the downstream channel signals and an antenna for transmitting the WDM downstream signal, and a WDM path between an antenna for receiving the WDM upstream signal and a component for splitting the WDM path for the WDM upstream signal, only. It is of course also possible to use either the same or separate paths for the WDM downstream and upstream signals, e.g. a single optical fiber that is used for both transmission directions (so-called single-fiber working) or two separate optical fibers each of which is used for a dedicated transmission direction (so-called dual-fiber working).

Further, the communication network may be designed in such a way that the full WDM downstream signal may be supplied to more than one or even all network units. This design may especially play a role in the fiber-optic field. For example, in a WDM-PON the WDM downstream path may comprise a remote node which is realized by a simple passive optical splitter.

The present invention is based on the finding that at least one new network unit can be integrated or re-integrated into a communication network comprising a central network node and an arbitrary but limited number of network units by first establishing a communication channel between the central network and the at least one network unit in a setup mode by using a broadcast channel in the downstream direction and a separate setup address range that is used to address the network units during the setup mode.

In this setup mode, the at least one network unit creates a setup channel signal, the frequency spectrum of which comprises, as a modulation component, a setup label which is selected from a predetermined set of at least two setup labels, wherein a predetermined setup address label is associated with each setup label, and transmits the setup channel signal to the central network node. The set of setup labels is available to the network unit and the network unit may use a given method to select one of the setup labels when starting the setup mode. For example, the setup label may be chosen randomly. The set of setup labels may be stored within the network unit, e.g. in a preferably non-volatile memory of a control unit comprised by the network unit.

The set of setup labels is chosen in such a way that none of the setup labels equals an operating label comprised by a set of operating labels, which is used for establishing a communication between the network units and the central network node in an operating mode.

The setup channel signal created by the at least one network unit at the central network node is transmitted towards the central network node. Thus, the presence of a new upstream channel signal created by the at least one network unit can be detected by detecting the presence of a respective new setup label within the WDM upstream signal. Detection can be effected by a communication control device, which can be integrated within the central network node (also as separate component of the network node) or realized as standalone device. Of course, the communication control device will usually be present at the location of the central network node.

If a new setup label (and thus the presence of a new setup channel signal) is detected within the WDM upstream signal, the setup address label associated with the setup label detected can be used to address the respective network unit. For this, it is necessary for the communication control device to know either the set of setup labels including the setup address labels associated therewith or the set of setup labels and a rule how to determine an associated setup address label for a given setup label.

In this way, the communication control device may create a downstream channel signal receivable by the at least one network unit by modulating the WDM downstream signal according to a downstream modulation signal comprising, as information to be transmitted to the at least one network unit, a setup information and an address information comprising the setup address label associated with the setup label detected. Thus, a broadcast channel is used in the downstream direction as the information included in the modulation signal is transported in each downstream channel signal comprised by the WDM downstream signal.

In this way, a communication channel is established between the newly added network unit and the communication control device for transporting setup information from the communication control device to the network unit, especially setup information that is necessary in order to carry out further steps of a setup procedure, like carrying out a collision detection and resolving procedure in case more than a single network unit joins the communication network at the same time.

According to an embodiment of the invention, the set of setup labels is a set of low frequency pilot frequencies, wherein preferably amplitude modulation is used to create the setup channel signal. For example, a set of 10 setup labels may be used in the form of 10 pilot frequencies $f_i$ ($f_1=100$ kHz, $f_2=110$ kHz, . . . , $f_{10}=190$ kHz).

The setup address label associated with each setup label may be a digital setup address label, and the respective digital setup address label may be included as digital information within the modulated WDM downstream signal and the downstream channel signals included therein, respectively. For example, the digital setup address label may represent a keyword that describes a property of the respective setup label. In case pilot frequencies are used as setup labels, the keyword may represent the frequency value, e.g. "xxx kHz", wherein "xxx" denotes the respective value of pilot frequency $f_i$ in kHz. In this way, the communication control device determines the setup address label by measuring the frequency $f_i$ of the pilot frequency that has been detected as (new) setup label within the WDM downstream signal. Of course, the measured or determined frequency can be numerically rounded to a neighboring known value of ideal known values of the pilot frequencies included in the set of setup labels in order to tolerate inaccuracies when creating or evaluating the respective signals.

According to an embodiment of the invention which is easy to implement, the downstream broadcast channel can be realized by amplitude-modulating the WDM downstream signal according to the downstream modulation signal. For this, a variable optical attenuator can be used in case of a fiber-optic communication network. However, it is generally possible to use any suitable modulation method to imprint the information included in the downstream modulating signal onto the WDM downstream signal depending on the kind of network and signals used within the network. For example, frequency modulation or phase modulation and related kinds of digital modulation methods like frequency shift keying (FSK) or phase shift keying (PSK) may also be used as an alternative to amplitude modulation and related digital methods like amplitude shift keying (ASK).

Generally, the invention is applicable to fiber-optic communication networks, especially for WDM-PONs, i.e. in cases in which the WDM downstream signal and the WDM upstream signal and the respective channel signals and the setup channel signals are optical signals.

According to a further embodiment, in the communication control device, the presence of more than a single setup channel signal is detected by detecting the presence of new setup labels that are comprised within the WDM upstream signal, and, if more than a single setup channel signal is detected, all network units which do not use a selected one of the setup labels received are instructed, by transmitting a respective setup information from the central network node to the respective network units, to stop creating a setup channel signal. This can be effected by merely stopping to modulate an upstream channel signal, wherein the network unit still creates an upstream channel signal that does not comprise a respective modulation component, or by switching off completely the respective transmitter unit.

Stopping the network unit to create a setup channel signal may be necessary if the modulation component representing the respective setup label inadvertently influences information that shall be transmitted to the network unit which uses the selected setup label.

Moreover, it may happen that two or more network units join the network at the same time and coincidentally use the same setup label. In this case, the downstream signal is addressed and further processed by the two or more network units. This makes it impossible to assign a unique operating label to these network units as all these network units will be simultaneously addressed as long as they create the respective setup channel signals.

According to an embodiment of the invention, such a collision can be detected and resolved by the steps of:

(a) transmitting an instruction message including a respective setup address label associated with the single setup label previously detected and setup information for instructing any network unit addressed to randomly change the setup label;
(b) detecting whether more than a single setup label is included within the WDM upstream signal;
(c) instructing all network units, which do not use a selected one of the setup labels detected in step (b), to stop creating a setup channel signal if more than a single setup channel signal is detected in step (b) or assuming that the single setup label detected is used by a single network unit, only, and further communicating with this single network unit;
(d) wherein the steps (a) to (c) are executed at least once, preferably n times, wherein n is a predetermined integer number.

In this way, the probability of an unrecognized collision of two or more simultaneously joining network units can be reduced to almost zero if the integer number n is chosen appropriately.

Generally, after having carried out these steps for detecting and preventing a collision between two or more simultaneously joining network units, the already existing communication channel can be used for further transmitting information or instructions to the at least one network unit. Even a bidirectional communication channel between the communication control device and the at least one network unit can be realized, wherein already the information included in the setup channel signal, i.e. the respective setup label, can be regarded as upstream communication channel, so that a bidirectional communication channel already exists. It is further possible to modify the setup label used by the respective network node in order to transmit additional information in the upstream direction. For example, if a pilot frequency is used as setup label, this pilot frequency can be used as carrier frequency that is modulated to transport the further information in the upstream direction.

According to a further embodiment of the invention, the setup mode is terminated after a setup information has been transmitted from the communication control device to the at least one network unit, which includes information concerning a unique operating address label that has been assigned to the at least one network unit, wherein the operating address label is selected from a set of operating address labels different from the setup address labels and wherein the operating address label is used to establish a unidirectional communication channel to the at least one network unit in an operating mode. In the operating mode, the communication control device creates a downstream channel signal receivable by the at least one network unit by modulating the WDM downstream signal according to a modulation signal comprising, as information to be transmitted to the at least one network unit, an operating information and an operating address label associated with the operating label detected. The respective network unit receives the respective downstream channel signal and extracts and further processes the operating information in case the operating address label included within the respective downstream channel signal equals the operating address label that has been assigned to the network unit.

If a unidirectional communication channel is established, only, the at least one network may also be instructed to stop creating a setup channel signal so that the setup label used during the setup mode is no longer occupied.

Thus, the setup label and setup address label which have been used during the setup mode are again free for future use in the setup mode for integrating a further network unit.

According to a further embodiment, either in the setup mode or in the operating mode an additional information can transmitted to the at least one network unit including the information concerning an operating label associated with the operating address label that has been assigned to the at least one network node, wherein the operating label is selected from a set of operating labels different from the setup labels and wherein an additional upstream communication channel, i.e. a bidirectional communication channel between the communication control device and the at least one network unit is established in the operating mode. In this embodiment, the at least one network unit, in the operating mode, creates an operating channel signal comprising the operating label as modulation component and transmits the operating channel signal in the direction of the central network node. The communication control device detects the presence of an operating channel signal created by the at least one network unit within the WDM upstream signal by detecting the respective new setup label and further detects an upstream information included within the operating label. The communication control device knows that this upstream information is received from the network unit to which the respective operating address label has been assigned.

Of course, the use of the set of operating labels and operating address labels is administered by the communication control device. For example, operating labels or operating address labels which are in use can be written to a table or simply be marked as "used". Unused operating labels or operating address labels can be assigned to newly joining network units.

In this way, a unique operating address label can be assigned to a newly joining network unit and a unidirectional communication channel or even a bidirectional communication channel between the communication control device and the at least one network unit can be established.

According to a further embodiment of the invention, the set of operating labels is a set of low-frequency pilot frequencies, wherein preferably amplitude modulation is used to create the operating channel signal.

Generally, the unidirectional or bidirectional communication channels implemented by the setup channel signals, operating channel signals and downstream channel signals can be realized as embedded communication channels, i.e. the respective information is additionally modulated onto respective signals which already may carry information in "fundamental" communication channels between transceivers of the central network node and respective dedicated network units. For example, the signals realizing these "fundamental" communication channels may be high bit rate digital signals, wherein these signals may be additionally modulated according to a low-frequency modulation signal to embed the additional communication channels according to the invention in the existing signal. Of course, a "fundamental" communication channel is not required to establish such "low-frequency" communication channels. Rather, in case a new network unit joins the network, it may either be a setup channel signal that only includes the modulation component according to the respective setup label or a constant (i.e. time-invariant) modulation component, e.g. a carrier frequency. In case of an optical network, e.g. a WDM-PON, the setup channel signal may be created by a narrow-band laser source, which is digitally modulated, e.g. using ASK, so that a continuous series of 1 and 0 bits at a constant bit rate is created that is interpreted as idle signal.

This idle signal already carries clock information that may be used to synchronize the respective receiver unit at the central network node. The idle signal may additionally transport, in the respective low-frequency modulation component, the information included in the embedded channel according to the setup label. As already mentioned, the setup label may be time-variant, e.g. in case of a pilot frequency which itself is modulated in order to transport further information (further to the information included in a constant pilot frequency) in the upstream direction.

A network unit according to the invention comprises a transceiver device and a control unit, wherein the control unit is adapted to carry out the steps of the above-explained method that are to be performed at the network unit. Especially, the control unit may be configured to control the transceiver device in the setup mode in such a way that a setup channel signal is created comprising, as a modulation component, a setup label of the above-explained nature. Further, the control unit is configured to analyze the receive signal and, if a setup address label included within the receive signal corresponds to the setup address label associated with the setup label included within the setup channel signal, to control the transceiver unit or carry out further control steps according to a setup information included within the receive signal.

According to a further embodiment, the control unit may be configured to operate in an operating mode in which the control unit controls the transceiver to create an operating channel signal comprising, as modulation component, an operating label which is selected from a predetermined set of operating labels.

Of course, the transceiver unit may comprise a modulator unit or may be configured to create a setup or operating channel signal which is modulated in such a way that it includes, as modulation component, the respective setup label or operating label.

BRIEF DESCRIPTION OF THE DRAWINGS

In the following, the invention will be described with reference to a preferred embodiment apparent from the drawing. In the drawing, the Figures show:

FIG. 1 a schematic block diagram of a fiber-optic communication network realized as WDM-PON comprising a central network node or OLT, a remote node and a plurality of network nodes or ONUs;

FIG. 2 a more detailed schematic block diagram of the wavelength locking device comprised by the OLT in FIG. 1;

DETAILED DESCRIPTION OF THE INVENTION

Figure 3:
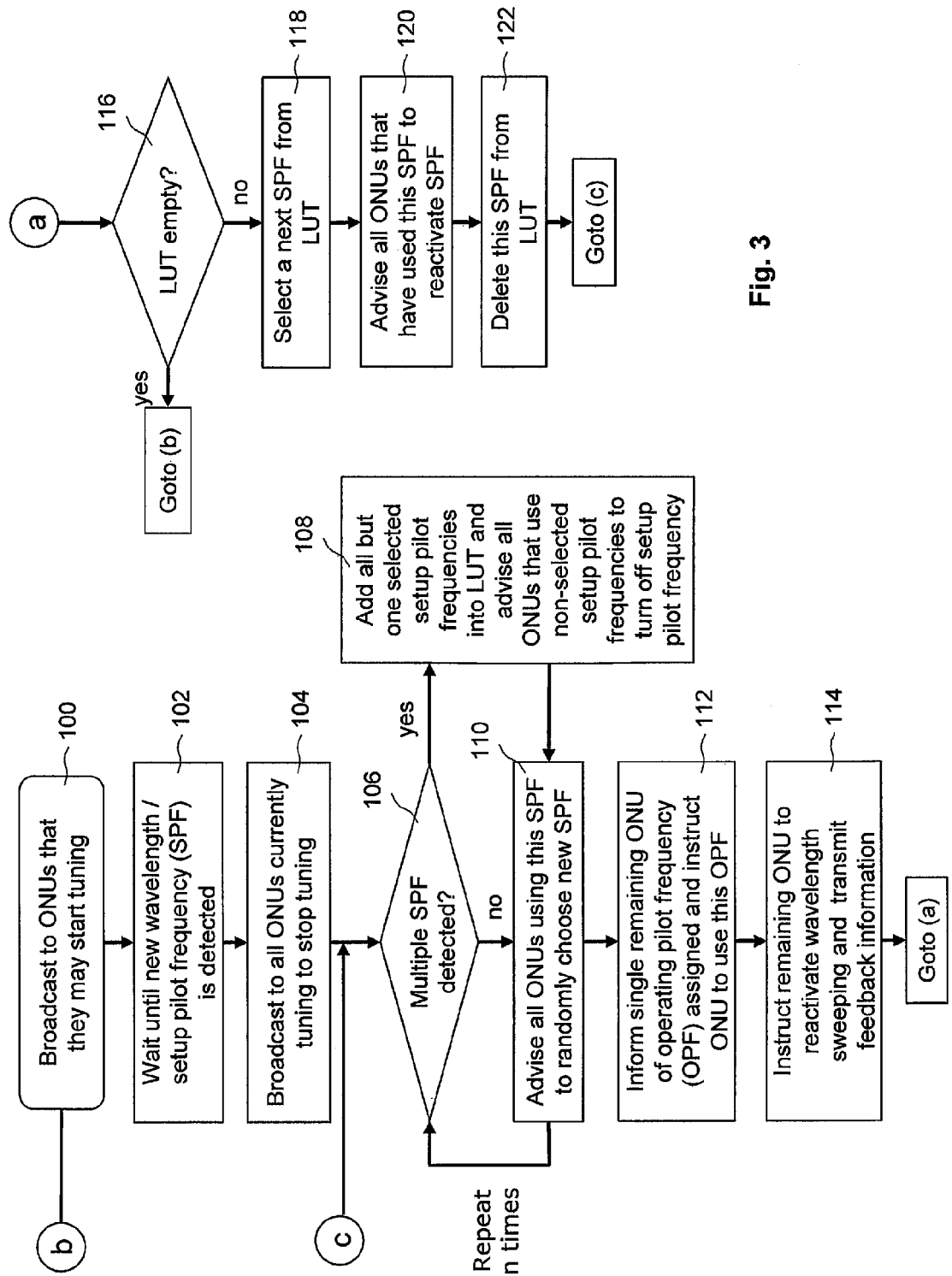
FIG. 3 a simplified flowchart of a procedure for adding new network units to a communication network, which is carried out in the communication control device.

FIG. 1 shows a communication network which is realized as wavelength-division multiplex passive optical network (WDM PON) 1 comprising a central network node or optical line terminal (OLT) 3, a remote node (RN) 5 and a plurality of network units or optical node units (ONUs) 7. It is noted that, even if the invention is explained with respect to a WDM-PON, it can be realized in connection with all kinds of communication networks consisting of a central network node and an arbitrary but fixed number of network units, irrespective of the specific realization of the transmission medium used to connect the network units to the central network node. Although according to FIG. 1 the communication network is implemented as WDM-PON, it may also be realized, for example, as WDM radio communication network in which a different RF carrier frequency is used for each of the communication channels between a network unit and the central network node. The principle of establishing a communication channel between a new network unit or ONU 7 and the central network node or OLT 3 remains the same.

In the WDM-PON shown in FIG. 1 the OLT 3 comprises, in a transmit path 9, an optical transmitter array 11, an optical multiplexer unit 13 and an optical diplexer unit 15 as is the case with conventional OLTs. Further, the transmit path 9 of the OLT 3 comprises an optical modulator unit 17, which is provided within the optical path 9 between a WDM output port 19 and a first splitting port 21 of the diplexer unit 17. Each of a number of N optical transmitters 23 comprised by the optical transmitter array 11 may be realized as narrow-band laser unit, each of which creates an optical downstream channel signal $SD_i$ ($1 < i < N$) that is modulated according to a respective data stream (not shown in FIG. 1). These data and the information contained therein are transported to a respective network unit 25, thereby establishing a "fundamental" downstream communication channel between the OLT 3, more precisely between a respective port of the OLT 3 realized by the respective optical transmitter 23, and the dedicated network unit 7. The "fundamental" and embedded downstream channels are indicated in FIG. 1 by the respective dotted line. The same applies to the corresponding "fundamental" and embedded upstream communication channel.

Each optical downstream channel signal $SD_i$ created by the optical transmitters 23 is supplied to a dedicated input port of the optical multiplexer 13, which multiplexes the optical downstream channel signals into an optical WDM downstream signal $SD_{WDM}$, which is supplied to an input port of the optical modulator unit 17. The optical modulator unit 17 may, for example, be realized as variable optical modulator (VOA), which attenuates the optical WDM downstream signal $SD_{WDM}$ supplied to its input port according to an electrical modulation signal $S_{mod}$. Thus, the optical WDM downstream signal $SD_{WDM}$, which comprises the N downstream channel signals $SD_i$, is modulated according to the modulation signal $S_{mod}$. Likewise, each of the downstream channel signals $SD_i$ is modulated in the same manner. In this way, a broadcast communication channel is established.

The optical WDM downstream signal $SD_{WDM}$ supplied to the first splitting port of the optical diplexer unit 15 is output at a WDM port 33 (which also defines a WDM port of the OLT 3) of the optical diplexer unit 15, which is connected to a near end of an optical fiber span 35, the far end of which is connected to a WDM port 37 of the remote node 5. The remote node 5, which may be realized as cyclic arrayed waveguide grating (AWG), is configured to demultiplex the optical WDM downstream signal $SD_{WDM}$ supplied to the WDM port 37 into the optical downstream channel signal $SD_i$ and to multiplex upstream optical channel signals $SU_i$ ($1 < i < N$) created at the ONUs 7 and received at dedicated channel ports of the remote node 5 into an optical WDM upstream signal $SU_{WDM}$, which is output at the WDM port 37.

As shown in FIG. 1, each ONU 7 is connected to a dedicated channel port of the remote node 5 by a fiber span 39, which may comprise a single optical fiber 41. That is, single fiber working is used between the ONUs 7 and the remote node 5. It is, of course, also possible to connect each ONU 7 to the respective channel port of the remote node 5 by two optical fibers realizing dual fiber working. In this case, the remote node may be realized by two separate AWGs, wherein a first AWG is provided in a downstream path of the remote node 5 and operates as demultiplexer unit, only, and a second AWG is provided in an upstream path of the remote node 5 and operates as demultiplexer unit, only. The WDM port 37 of the remote node 5 may in this embodiment be connected to a WDM port of an optical diplexer unit that separates the upstream and downstream paths within the remote node 5. A first and a second splitting port of this diplexer unit may be connected to the WDM ports of the first and second AWG, respectively.

If dual fiber working is used between the OLT 3 and the remote node 5, the remote node diplexer is, of course, obsolete. In this case, the optical fiber span 35 comprises two optical fibers, each of which is connected to a WDM port of a first and second AWG realizing a downstream and upstream port of the WDM port 37 and to a downstream and upstream WDM port of the OLT 3 and second WDM port of the remote node, which in this case may be realized by the output port of the optical modulator unit 17 and an input port of a separate receive path. It shall be mentioned in this regard that the term "port" is used throughout this description to designate a logical as well as a hardware port, wherein a logical port may be realized by a single hardware port in case of single fiber working or by two hardware ports in case of dual fiber working.

As shown in FIG. 1, the OLT 3 further comprises, in a receive path 25, an optical receiver array 27, an optical demultiplexer unit 29, an optical amplifier 31 and the optical diplexer unit 15 as is the case with conventional OLTs.

A second splitting port 22 of the optical diplexer unit 15 is connected to an input port of the optionally used optical amplifier 31. An output port of the optical amplifier 31 is connected to a WDM port of the demultiplexer unit 29. Each of the channel ports of the demultiplexer unit is connected to an input port of a dedicated optical receiver 43 of the receiver array 27.

Further, the OLT 3 comprises a control unit 45 and a wavelength locking unit 47, which form a signal detection and processing device. An input port of the wavelength locking unit 47 is connected to the output port of the optical amplifier 31. An output port of the wavelength locking unit 47 is connected to an input port of the control unit 45.

The optical WDM upstream signal $SU_{WDM}$, which is received at the input port 33 of the optical diplexer unit 15, is output at the second splitting port 22 of the optical diplexer unit 15. The optical WDM upstream signal $SU_{WDM}$ is amplified by the optical amplifier 31 and supplied to the WDM port 49 of the demultiplexer unit 29, which demultiplexes the optical WDM upstream signal $SU_{WDM}$ into the optical upstream channel signal $SU_i$. The optical upstream channel signals $SU_i$ are supplied to the respective dedicated optical receiver 43.

In this way, a "fundamental" upstream communication channel can be established between each of the ONUs 7 and the OLT 3, more precisely between each of the ONUs 7 and a respective port of the OLT 3 realized by the respective optical receiver 43.

As the diplexer unit 15 is used in the OLT 3 to separate/combine the transmit path 9 and the receive path 25, it is necessary to create the downstream channel signals $SD_i$ in a first optical band, e.g. the optical L-band, and the respective upstream channel signals $SU_i$ in a second optical band, e.g. the optical C-band. However, it is generally possible to use the same wavelengths or wavelength bands for the downstream and upstream signals even in single working fiber spans if suitable means are provided for separating/combining the optical paths like optical circulator devices.

As apparent from FIG. 1, the optical WDM upstream signal $SU_{WDM}$ is also supplied to the input port of the wavelength locking unit 47 by splitting the optical power of the amplified optical WDM upstream signal $SU_{WDM}$ output by the optical amplifier 31. For this purpose, preferably an asymmetric wavelength-independent optical coupler is used, which is designed in such a way that a small portion of the optical power of the optical WDM upstream signal $SU_{WDM}$ is supplied to the optical wavelength locking unit 47, e.g. a portion of 1 to 3 percent.

The control unit 45, the optical wavelength locking device 47 and the optical modulator unit 17 are, in the following, also referred to as communication control device 59, which fulfills all tasks necessary to establish a communication channel, preferably an embedded communication channel, between the central network node or the communication control device 59, respectively, and one or more selected or all ONUs. For this, the optical wavelength locking device 47 is not required. Instead, a simple optical receiver could be used, which transforms the optical WDM upstream signal $SU_{WDM}$ into an electrical signal. For this purpose, a slow (i.e. a low-bandwidth) optical receiver (e.g. comprising a slow photodiode) is sufficient as the embedded communication channel uses low-frequency modulation components, only, that are transported by the channel signals, which also transport the high frequency or high bit rate information.

However, the optical wavelength locking device 47 makes it possible for the control unit to gather information concerning the tuning situation of the optical upstream channel signals. This information may be used to effect a coarse or even a fine tuning of the optical wavelengths of newly joining ONUs 7 or a continuous fine tuning of the wavelengths of ONUs 7 operating in the operating mode.

FIG. 2 shows a more detailed schematic block diagram of a simple embodiment of an optical wavelength locking device 47. It comprises an optical comb filter 55 and a first low-bandwidth optical receiver 57, which may include a low-bandwidth photodiode. It is of course also possible to use a high-bandwidth receiver of photodiode. However, if only a low-frequency modulation component is used to realize the embedded communication channel, the use of respective low-bandwidth components is advantageous with respect to costs. The optical comb filter 55 may have the same filter characteristic as the demultiplexer unit 29 (or the remote node 5; however, the remote node 5 may also be realized in a different way, e.g. as simple power splitter). However, the spectral filter characteristic of the comb filter 55 may be shifted versus the spectral characteristic in order to achieve a higher sensitivity with respect to frequency variations of the optical wavelengths of the optical channel upstream signals $SU_i$.

As shown in FIG. 2, the wavelength locking device further comprises an optical splitter 63, which splits the amplified optical WDM upstream signal $SU_{WDM}$ and supplies a first power portion to the optical comb filter 55 and a second power portion to a second low-bandwidth optical receiver 61. This second optical receiver 61 creates an (electrical) reference signal that is also supplied to the control unit 45, which uses this reference signal in order to compensate, in the (electrical) signal created by the first optical receiver 57, variations of the optical power in the interesting spectral range of the low-frequency modulation component to be detected.

As frequency locking devices and their function are known in the prior art, further detailed explanations are unnecessary. Any type of wavelength locking device 47 may be used in connection with the communication control device 59, which delivers to the control unit 45 an information concerning the presence and amplitude or power variation of a desired low-frequency modulation component within the optical channel upstream signals $SU_i$. In this way, it is possible to tune the optical wavelength of the optical channel upstream signals $SU_i$ by providing a feedback information to the respective ONU using the embedded downstream broadcast channel.

Each ONU 7 comprises a transceiver unit 51 configured to create a respective optical upstream channel transmit signal $SU_i$ that comprises the desired information as modulation components. Generally, the desired information comprises, in the operating mode, a modulation component comprising information, especially according to a high bit rate wanted signal, that is supplied to the ONU and which is to be transported to the central network node. In this way a "fundamental" upstream communication channel is established between the respective ONU 7 and the respective port of the central network node 3.

Additionally, the optical upstream channel transmit signal $SU_i$ may comprise a further, preferably low-frequency component, according to a setup label or an operating label. The information included therein is detected by the communication control device, which may be realized as separate unit, which can be used for upgrading an existing network node, of even as standalone unit, which can be provided at the same place as the central network node or even at a different location.

Of course, the modulation component of the embedded channel must not overlap with the modulation component of the "fundamental" channel in the spectrum of the upstream and downstream channel signals in order to avoid interference.

Each ONU 7 further comprises a control unit 53, which is configured to control the transceiver unit in such a way that a communication channel, preferably an embedded communication channel, can be established in a setup mode and maintained or used during an operating mode.

The transceiver unit 51 is further adapted to receive the respective optical downstream channel signals $SD_i$ and to extract the information transported in the respective "fundamental" downstream communication channel from the optical downstream channel signals $SD_i$ as well as to further process this information.

Further, the transceiver unit 51 is configured to extract from the optical downstream channel signals $SD_i$ the information that is included in the embedded downstream channel, i.e. the information included in the low-frequency modulation component created by the communication control device 59. This can be done in various manners know in the prior art. A preferred method is to asymmetrically split the optical signal provided to the optical downstream channel signals $SD_i$ supplied to the transceiver device 51 and with respect to the optical power and to supply a small portion of the optical power of the optical downstream channel signals $SD_i$ to a low-bandwidth optical receiver. This receiver merely detects the low-frequency components included in the optical downstream channel signals $SD_i$. The respective electrical signal may be supplied to the control unit 53, as indicated in FIG. 1, for further processing.

In order to create the respective channel upstream signal $SU_i$ according to a modulation information or modulation signal provided by the control unit 53, the transceiver unit 51 may comprise an optical modulator, such as a VOA. It is of course also possible to create an optical modulation signal for the tunable optical transmitter included in the optical transceiver unit 53.

In the following, a method for establishing a communication channel between the communication control device 59 and an ONU 7, which joins or re-joins the communication network 1, will be explained with reference to FIG. 3. In the embodiment described, the communication channel is also used to tune the optical wavelength of the tunable optical transmitter comprised by a newly joining network unit such that it matches the optical WDM channel that has been assigned to this ONU 7. In the embodiment of FIG. 1, this assignment is effected by connecting the respective ONU 7 to a channel port of the remote node 5 that is realized by a cyclic AWG.

FIG. 3 shows a simplified flowchart of a procedure for adding new network units to a communication network, which is carried out in the communication control device 59. According to this exemplary procedure, in a first step 100, the communication control device 59 transmits a broadcast command instructing all ONUs 7 that are attached to the remote node 5 and that operate in a setup mode (i.e. the respective ONUs 7 are aware that they have not been assigned a valid operating pilot frequency) to start a tuning process.

It should be noted that any command or instruction in the downstream communication channel is created in the communication control device 59 by creating a suitable modulation signal $S_{mod}$ by the control unit 45 and modulating the optical WDM downstream signal $SD_{WDM}$ accordingly. A broadcast command that is addressed to all ONUs 7, which are in a setup mode, includes, as address information, a respective setup broadcast address label and, as setup information, the desired instruction that shall be carried out by the ONUs 7 addressed. Likewise, a corresponding broadcast command that is addressed to all ONUs 7, which are in an operating mode, includes, as address information, a respective broadcast operating address label and, as setup information, the desired instruction that shall be carried out by the ONUs 7 addressed. A command that is addressed to a specific ONU 7 is created in the same way. However, instead of a setup or operating broadcast address label, the setup or operating address label is used that is associated with the setup label used by the respective ONU 7 or that has been assigned to the respective ONU 7, respectively.

As already mentioned above, amplitude modulation is used for creating the modulation component of the embedded downstream communication channel in the optical WDM downstream signal $SD_{WDM}$, e.g. an ASK modulation scheme using a constant low (as compared to a bit rate of the "fundamental" downstream communication channel) bit rate.

It should be noted that an ONU 7 may be switched into the setup mode by the control unit 53 as a reaction to any incident that may cause the ONU 7 to transmit at a wavelength that does not, at least coarsely, match the WDM channel that has been assigned to the ONU 7. As a reaction to all other incidents that may have led to an interruption of the embedded communication channel without losing the wavelength tuning of the optical transmitter, the ONU 7 may re-establish the embedded communication channel using the operating address label (and, in case of a bidirectional communication channel, the operating label) that has been used before the communication channel has been interrupted. For this, the ONU 7 or the control unit 53 may store the current operating address label (and, as the case may be, the current operating label) that has been assigned, preferably in a non-volatile storage.

It is further noted that, in the embodiments described in the Figures, the setup and operating labels are realized as optical wavelengths. However, the procedures shown in FIG. 3 can also be realized if setup or operating labels or setup or operating labels of any other type are used.

In a next step 102 of the procedure in FIG. 3, the communication control device 59 waits until, as a reaction to the previous broadcast command in step 100, a new setup wavelength is detected. Of course, this detection can be carried out by simply detecting whether a new setup pilot frequency is detected as all other ONUs 7 are in the operating mode and therefore use an operating label, i.e. an operating frequency (and any setup frequency comprised by the set of at least two setup frequencies is different from any operating frequency comprised by the set of N operating frequencies).

If a new setup frequency is detected, i.e. a new ONU 7 is to be integrated into the network, in a next step 104, a broadcast command to stop tuning is transmitted to all ONUs 7 that are in the setup mode. A new setup frequency will be detected if at least one ONU 7 that carries out the tuning process, i.e. that does a wavelength sweep covering a sufficiently broad wavelength range, creates an optical upstream channel signal at a wavelength that matches the dedicated WDM channel. The stop command issued by the communication control device 59 causes all ONUs 7 addressed to stop the sweeping process. Thus, the at least one new setup (upstream) channel signal (setup channel signals created by an ONU 7 are upstream channel signals) is maintained at the current optical wavelength, which at least coarsely matches the respective WDM channel.

In a next step 106, the communication control device 59 determines whether more than one new setup pilot frequency is currently detected. If so, in a step 108, a command is sent all ONUs 7 that are not using a selected one of the new setup pilot frequencies received to turn off their setup pilot frequencies.

In order to address a specific ONU 7, which is in the setup mode, an address label is used that is associated with the setup pilot frequency used by the ONU 7. For example, if the ONU uses a setup pilot frequency of 100 kHz, the setup address label associated therewith could read "100" or "100 kHZ". Both, the communication control device 59 and the ONUs 7 must know either the set of setup labels of setup pilot frequencies and the setup address labels associated therewith or the setup pilot frequencies and a rule to determine the setup address label if a setup pilot frequency has been received or selected.

Further, in step 108, the communication control device 59 writes all pilot frequencies that have not been selected for carrying out the further procedure to a look-up table (LUT).

In a next step 110, the communication control device 59 sends a command addressed to all ONUs 7 using the setup pilot frequency selected to randomly choose a new setup pilot frequency from the set of setup pilot frequencies. Then, the communication control device 59 checks again whether multiple setup pilot frequencies are detected.

The loop consisting of the steps 106, 108 and 110 assures that it does not remain undetected if two or more newly joining ONUs 7 incidentally have chosen the identical setup pilot frequency. In this case, it would not be possible to uniquely identify and address a respective ONU. This loop is repeated n times, wherein n is an integer number and equals e.g. 2 to 5, depending on the number of setup labels provided and the number N of ONUs 7 that can be attached to the network 1.

After having repeated the loop n times, the communication control device 59 transmits a unique operating address label, i.e. a unique operating pilot frequency, to the remaining single ONU 7 in step 112. Of course, this unique pilot operating address label may be chosen from a table of currently unused operating address labels. The setup mode ends in the ONU 7 upon having received the information concerning the setup pilot frequency that has been assigned to the ONU 7.

In case of the embodiment according to FIG. 1, in which an operating label in form of an operating pilot frequency is assigned to all ONUs 7, an operating label instead of an operating address label may be transmitted to the respective ONU 7 if the ONU 7 knows a rule that makes it possible to determine the operating address label associated with the operating label received. For example, if the ONU receives the information to use "200 kHz" as operating label, i.e. operating pilot frequency, and if, in the operating mode, it will be addressed by the address label "200" or "200 kHz", it is unnecessary to transmit information to the ONU comprising the operating address label to be used in the operating mode.

In step 114, the communication control device 59 sends an instruction to the remaining single ONU 7 to reactivate the tuning process. Further, in step 114, the communication control device 59 detects feedback information that can be used, at the single ONU 7, to improve the spectral position of wavelength transmitted with respect to the WDM channel assigned and transmits this information to the ONU. In the communication control device 59, this feedback information is determined by the control unit 45 from the signal delivered from the wavelength locking unit 47. Generally, various methods for tuning the wavelength in the ONU 7 by determining feedback information from a signal or information delivered by such a wavelength locking device are known in the prior art. Thus, it is unnecessary to further explain the tuning method in detail as a person skilled in the art will be able to select and use (and, if necessary, to adjust) a known method in order to adjust the wavelength created by an ONU 7 to the respective dedicated WDM channel.

The procedure including the steps 106 to 114 is repeated for all new setup pilot frequencies that have been detected by carrying out the loop comprising the steps 106, 108 and 110, i.e. that have been written to the look-up table. This is done by determining, in step 116, whether the look-up table is empty and, if not, selecting a next one of the setup pilot frequencies included in the look-up table in step 118. In step 120, a command to reactivate the respective setup pilot frequency is transmitted to all ONUs 7 that have used this setup pilot frequency before having received the command to turn off the pilot frequency in step 108. In step 122, the respective setup pilot frequency is deleted from the look-up table.

In case the look-up table is empty, step 116 branches to step 100, i.e. further ONUs 7 that operate in the setup mode receive the command that they may start the tuning process.

Of course, the communication control device 59 may be configured to carry out a tuning process for all ONUs 7 which operate in the operating mode. This tuning may be effected continuously or in given time intervals or on demand.

The tuning in the operating mode may be effected in parallel to the above-explained setup procedure for assigning a unique address and/or operating pilot frequency.

LIST OF REFERENCE SIGNS 1 communication network/WDM-PON
3 central network node/OLT
5 remote node
7 network unit/ONU
9 transmit path
11 optical transmitter array
13 optical multiplexer unit
15 optical diplexer unit
17 optical modulator unit/VOA
19 WDM output port of multiplexer unit
21 first splitting port of optical diplexer unit
22 second splitting port of optical diplexer unit
23 optical transmitter
25 receive path
27 optical receiver array
29 optical demultiplexer unit
31 optical amplifier
33 WDM port of optical diplexer unit
35 optical fiber span
37 WDM port of remote node
39 fiber span
41 optical fiber
43 optical receiver
45 control unit
47 wavelength locking unit
49 WDM port of demultiplexer unit
51 transceiver unit
53 control unit of network unit/ONU
55 optical comb filter
57 first low-bandwidth optical receiver
59 communication control device
61 second low-bandwidth optical receiver
63 optical splitter
100 first step 100
$SD_{WDM}$ optical WDM downstream signal
$SU_{WDM}$ optical WDM upstream signal
$S_{mod}$ optical modulation signal
$SD_i$ optical downstream channel signal
$SU_i$ optical upstream channel signal

The invention claimed is:

1. A method for establishing a communication channel, preferably an embedded control channel, between a central network node and at least one network unit to be integrated in a communication network comprising the central network node and an arbitrary but limited number of network units, the central network node being adapted to create and output a wavelength-division multiplex (WDM) downstream signal comprising downstream channel signals to be transmitted to the network units and to receive a WDM upstream signal comprising upstream channel signals created by the network units, the method comprising the steps of:
   (a) in a setup mode, creating a setup channel signal at the at least one network unit, the frequency spectrum of which comprises, as a modulation component, a setup label which is selected from a predetermined set of at least two setup labels, a predetermined setup address label being associated with each setup label, and transmitting, from the at least one network unit, the setup channel signal in the direction of the central network node;
   (b) detecting, at the central network node, the presence of a new upstream channel signal created by the at least one network unit within the WDM upstream signal by detecting a respective new setup label and determining the setup address label associated with the setup label detected, and creating, at the central network node, a downstream channel signal receivable by the at least one network unit by modulating the WDM downstream signal according to a downstream modulation signal comprising, as information to be transmitted to the at least one network unit, a setup information and an address information comprising the setup address label associated with the setup label detected, wherein the setup information comprises a unique operating address label that has been assigned to the at least one network unit, wherein the operating address label is selected from a set of operating address labels different from the setup address labels; and
   (c) at the at least one network unit, receiving the respective downstream channel signal and extracting and further processing the setup information in case the setup address label included within the respective downstream channel signal equals the setup address label associated with the setup label of the setup channel signal that has been sent by the at least one network unit.

2. The method according to claim 1, wherein the set of setup labels is a set of low frequency pilot frequencies, and wherein preferably amplitude modulation is used to create the setup channel signal.

3. The method according to claim 1, wherein the setup address label associated with each setup label is a digital setup address label and the respective digital setup address label is included as digital information within the modulated WDM downstream signal and the downstream channel signals included therein, respectively.

4. The method according to claim 1, wherein the WDM downstream signal is amplitude-modulated according to the downstream modulation signal.

5. The method according to claim 1, wherein the WDM downstream signal and the WDM upstream signal and the respective channel signals and the setup channel signals are optical signals.

6. The method according to claim 1, wherein if more than a single setup channel signal is detected, all network units which do not use a selected one of the setup labels received are instructed, by transmitting a respective setup information to the respective network units, to stop creating a setup channel signal, and wherein the presence of more than a single setup channel signal is detected by detecting the presence of new setup labels that are comprised within the WDM upstream signal.

7. The method according to claim 6, further includes the steps of:
   (d) transmitting an instruction message including a respective setup address label associated with the single setup label previously detected and setup information for instructing any network unit addressed to randomly change the setup label;
   (e) detecting whether more than a single setup label is included within the WDM upstream signal; and
   (f) instructing all network units, which do not use a selected one of the setup labels detected in step (d), to stop creating a setup channel signal, if more than a single setup channel signal is detected in step (e) or assuming that the single setup label detected is used by a single network unit, only, and further communicating with this single network unit;
   wherein the steps (d) to (f) are executed at least once, preferably n times, wherein n is a predetermined integer number.

8. The method according to claim 1, wherein the setup mode is terminated upon the setup information being transmitted to the at least one network unit, wherein the operating address label is used in an operating mode to establish a unidirectional communication channel to the at least one network unit by:
creating a downstream channel signal receivable by the at least one network unit by modulating the WDM downstream signal according to a modulation signal comprising, as information to be transmitted to the at least one network unit, an operating information and an operating address label associated with the operating label detected; and
at the at least one network unit, receiving the respective downstream channel signal and extracting and further processing the operating information in case the operating address label included within the respective downstream channel signal equals the operating address label that has been assigned to the at least one network unit.

9. The method according to claim 8, wherein either in the setup mode or in the operating mode an additional information is transmitted to the at least one network unit including the information concerning an operating label associated with the operating address label that has been assigned to the at least one network node, wherein the operating label is selected from a set of operating labels different from the setup labels, and wherein an additional upstream communication channel is established in the operating mode by
at the at least one network unit, creating an operating channel signal comprising the operating label as modulation component and transmitting the operating channel signal in the direction of the central network node; and
detecting the presence of an operating channel signal created by the at least one network unit within the WDM upstream signal by detecting the respective new setup label and further detecting an upstream information included within the operating label.

10. The method according to claim 9, wherein the set of operating labels is a set of low frequency pilot frequencies, and wherein preferably amplitude modulation is used to create the operating channel signal.

11. A communication control device for establishing a communication channel, preferably an embedded control channel, between a communication control device and at least one network unit to be integrated in a communication network comprising a central network node and an arbitrary but limited number of network units, the central network node being adapted to create and output a wavelength-division multiplex (WDM) downstream signal comprising downstream channel signals to be transmitted to the network units and to receive a WDM upstream signal comprising upstream channel signals created by the network units, the communication control device comprising:
(a) a signal detection and processing device adapted to receive the WDM upstream signal received by the central network node and to detect whether at least one setup channel signal created by the at least one network unit is included within the WDM upstream signal, the at least one setup channel signal comprising, as a modulation component, a setup label which is selected from a predetermined set of at least two setup labels, a predetermined setup address label being associated with each setup label;
(b) the signal detection and processing device being further adapted to create a modulation signal comprising, as information to be transmitted to the at least one network unit, setup information and address information including the setup address label associated with the setup label of the setup channel signal detected, wherein the setup information comprises a unique operating address label that has been assigned to the at least one network unit, wherein the operating address label is selected from a set of operating address labels different from the setup address labels; and
(c) a modulator unit adapted to be provided within the output path of the WDM downstream signal created by the central network node and to modulate the WDM downstream signal according to the modulation signal, so that each downstream channel signal comprises the modulation information.

12. The communication control device according to claim 11, wherein it is configured to receive and process an optical WDM upstream signal and to modulate an optical WDM downstream signal.

13. The communication control device according to claim 12, wherein the signal detection and processing device comprises an optical wavelength locking device including an optical filter device configured to transmit, with a predetermined frequency dependency, optical frequencies lying within channel bandwidths specified for the upstream channel signals included within the optical WDM upstream signal, and to output an electrical signal corresponding to the optical power of the filtered optical WDM upstream signal.

14. The communication control device according to claim 11, wherein the signal detection and processing device is configured to simultaneously analyze all modulation components comprising the setup labels and operating labels included within the setup channel signals and operating channel signals, respectively, comprised by the WDM upstream signal received or comprised within the WDM upstream signal filtered by the wavelength locking device, preferably by using a Fast Fourier Transform based signal processing of the setup pilot frequency and operation pilot frequency spectrum.

15. A central network node for a communication network, the central network node being configured to be connected to a plurality of network units, to create and output a wavelength-division multiplex (WDM) downstream signal comprising downstream channel signals to be transmitted to the network units and to receive a WDM upstream signal comprising upstream channel signals and setup channel signals created by the network units, wherein the central network node comprises a communication control device according to claim 11.

16. A network unit for a communication network comprising a central network node and an arbitrary but limited number of network units, the network unit comprising a transceiver device and a control unit, wherein:
(a) the transceiver device is configured to receive a downstream channel signal created at a central network node of the communication network and to supply a respective receive signal to the control unit, and to create an upstream channel signal according to a control information received from the control unit, and
(b) the control unit is configured to operate in a setup mode and an operating mode, and
(c) the control unit is further configured to perform the following tasks in the setup mode:
(i) controlling the transceiver device to create a setup channel signal comprising, as a modulation component, a setup label which is selected from a predetermined set of at least two setup labels, a predetermined setup address label being associated with each setup label, (ii) controlling the transceiver device to transmit the setup channel signal to the central network node, and (iii) analyzing the receive signal and, if a setup address label included within the receive signal corresponds to the setup address label associated with the setup label included within the setup channel signal, controlling the transceiver unit or carrying out further control steps according to a setup information included within the receive signal, wherein the setup information comprises a unique operating address label that has been assigned to the at least one network unit, wherein the operating address label is selected from a set of operating address labels different from the setup address labels.

17. The network unit according to claim 16, wherein the control unit is configured to further operate in an operating mode in which the control unit controls the transceiver unit to create an operating channel signal comprising, as modulation component, an operating label which is selected from a predetermined set of operating labels.

* * * * *